(12) United States Patent
Bletscher et al.

(10) Patent No.: US 12,472,670 B2
(45) Date of Patent: Nov. 18, 2025

(54) MOULD-CLOSING UNIT FOR AN INJECTION-MOULDING MACHINE FOR PROCESSING PLASTICS

(71) Applicant: ARBURG GMBH + CO KG, Lossburg (DE)

(72) Inventors: Rainer Bletscher, Baiersbronn (DE); Eberhard Duffner, Starzach (DE)

(73) Assignee: ARBURG GMBH + CO KG, Lossburg (DE)

( * ) Notice: Subject to any disclaimer, the term of this patent is extended or adjusted under 35 U.S.C. 154(b) by 385 days.

(21) Appl. No.: 18/012,301

(22) PCT Filed: Jun. 30, 2021

(86) PCT No.: PCT/EP2021/068000
§ 371 (c)(1),
(2) Date: Dec. 22, 2022

(87) PCT Pub. No.: WO2022/003025
PCT Pub. Date: Jan. 6, 2022

(65) Prior Publication Data
US 2023/0264403 A1   Aug. 24, 2023

(30) Foreign Application Priority Data
Jun. 30, 2020  (DE) .................... 10 2020 117 168.4

(51) Int. Cl.
*B29C 45/78*  (2006.01)
*B29C 45/17*  (2006.01)
(Continued)

(52) U.S. Cl.
CPC ...... *B29C 45/7653* (2013.01); *B29C 45/1761* (2013.01); *B29C 45/661* (2013.01);
(Continued)

(58) Field of Classification Search
CPC ........ B29C 45/1761; B29C 2045/1764; B29C 45/7653; B29C 45/661; B29C 45/681;
(Continued)

(56) References Cited

U.S. PATENT DOCUMENTS 4,948,358 A * 8/1990 Kushibe .............. B29C 45/6728
425/589
5,297,952 A * 3/1994 Leonhartsberger ... B29C 45/681
425/593
(Continued)

FOREIGN PATENT DOCUMENTS

DE  102007023337 A1  11/2008
DE  102014002474 A1   8/2014
(Continued)

OTHER PUBLICATIONS

International Search Report for corresponding application PCT/EP2021/068000 filed Jun. 30, 2021; Mail date Oct. 15, 2021.

*Primary Examiner* — Seyed Masoud Malekzadeh
(74) *Attorney, Agent, or Firm* — CANTOR COLBURN LLP

(57) ABSTRACT

In a mould-closing unit (F) for an injection-moulding machine for processing plastics, at least one mould carrier (10), which can be moved in a longitudinal direction (L-L) of the mould-closing unit (F), is arranged on a machine base (14) and between itself and a further mould carrier (12) forms a mould-clamping space (C), in which parts of at least one cyclically openable and closable injection mould (M) can be received. At least one linear guide (16), arranged in the longitudinal direction (L-L) on the machine base (14), serves for guiding the at least one movable mould carrier (10) when there is movement in the longitudinal direction (L-L). The mould carrier is supported on the machine base (14) and/or the at least one linear guide (16) by way of a load take-up (18), which has above the at least one linear guide
(Continued)

(16) an articulating region (20) for the at least one movable mould carrier (10), which region is connected to the movable mould carrier with a force fit or material bonding and the stiffness of which is greater in the longitudinal direction (L-L) than in a direction transverse to the longitudinal direction (L-L). The forces acting on the guide of the movable mould carrier during the operation of the injection-moulding machine are minimized by the load take-up (18) and/or the articulating region (20) being elliptical in cross section, with the minor axis of the ellipse extending in a direction transverse to the longitudinal direction (L-L) of the mould-closing unit (F).

16 Claims, 7 Drawing Sheets

(51) Int. Cl.
  *B29C 45/66* (2006.01)
  *B29C 45/68* (2006.01)
  *B29C 45/76* (2006.01)
(52) U.S. Cl.
  CPC .. *B29C 45/681* (2013.01); *B29C 2945/76013* (2013.01); *B29C 2945/76224* (2013.01); *B29C 2945/76387* (2013.01); *B29C 2945/76568* (2013.01); *B29C 2945/76705* (2013.01)
(58) Field of Classification Search
  CPC ........... B29C 2945/76224; B29C 2945/76387; B29C 2945/76705
  See application file for complete search history.

(56) References Cited

U.S. PATENT DOCUMENTS

| | | | | |
|---|---|---|---|---|
| 5,478,231 | A * | 12/1995 | Hehl | B29C 45/1761 425/451.7 |
| 5,511,963 | A * | 4/1996 | Hehl | B29C 45/1751 100/231 |
| 5,578,329 | A * | 11/1996 | Hehl | B29C 45/1761 100/231 |
| 7,134,870 | B2 * | 11/2006 | Nishimura | B29C 45/1761 425/589 |
| 9,254,597 | B2 * | 2/2016 | Okada | B29C 45/1761 |
| 9,381,690 | B2 * | 7/2016 | Nishizawa | B29C 45/1744 |
| 10,384,383 | B2 * | 8/2019 | Kitta | B29C 45/1761 |
| 10,946,571 | B2 * | 3/2021 | Duffner | B29C 45/1751 |
| 11,077,594 | B2 * | 8/2021 | Kitta | B22D 17/263 |
| 11,858,185 | B2 * | 1/2024 | Kitta | B22D 17/22 |
| 2004/0208952 | A1 * | 10/2004 | Nishimura | B29C 45/1761 425/595 |
| 2007/0048398 | A1 * | 3/2007 | Tsuji | B29C 45/7653 264/319 |
| 2008/0102156 | A1 * | 5/2008 | Wang | B29C 45/1761 425/589 |
| 2008/0175938 | A1 | 7/2008 | Teng | |
| 2013/0224329 | A1 * | 8/2013 | Keinath | B29C 45/661 425/593 |
| 2015/0099030 | A1 * | 4/2015 | Kirihata | B29C 45/1761 425/589 |
| 2015/0099031 | A1 * | 4/2015 | Okada | B29C 45/1761 425/593 |
| 2016/0023391 | A1 * | 1/2016 | Nishizawa | B29C 45/1744 425/575 |
| 2017/0274569 | A1 * | 9/2017 | Kitta | B29C 45/1744 |
| 2017/0348888 | A1 * | 12/2017 | Nagami | B29C 45/66 |
| 2018/0022001 | A1 * | 1/2018 | Kitta | B22D 17/26 425/186 |
| 2018/0207848 | A1 | 7/2018 | Kung | |
| 2019/0118447 | A1 * | 4/2019 | Kilian | B29C 45/76 |
| 2019/0263037 | A1 * | 8/2019 | Duffner | B29C 45/66 |
| 2021/0394412 | A1 * | 12/2021 | Kitta | B29C 45/1744 |

FOREIGN PATENT DOCUMENTS

| | | | | |
|---|---|---|---|---|
| DE | 112016000803 | T5 | 11/2017 | |
| DE | 102016119583 | B3 | 1/2018 | |
| JP | 2014104732 | A | 6/2014 | |
| JP | 2016010885 | A | 1/2016 | |
| JP | 2016153231 | A * | 8/2016 | ............ B22D 17/22 |
| WO | 9841380 | A1 | 9/1998 | |
| WO | 2009051095 | A1 | 4/2009 | |
| WO | 2021224344 | A1 | 11/2021 | |

* cited by examiner

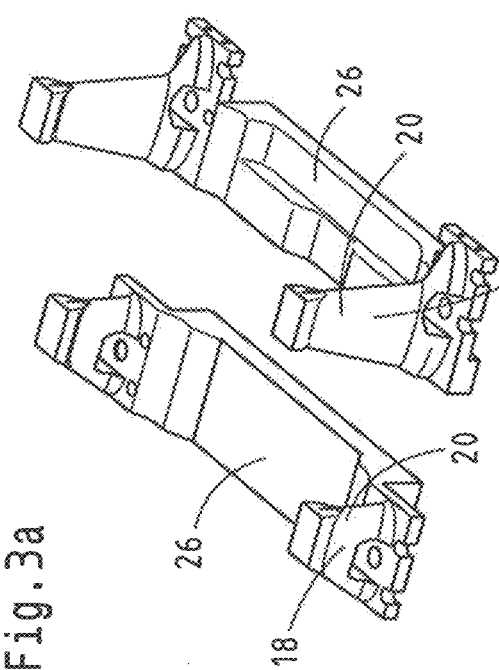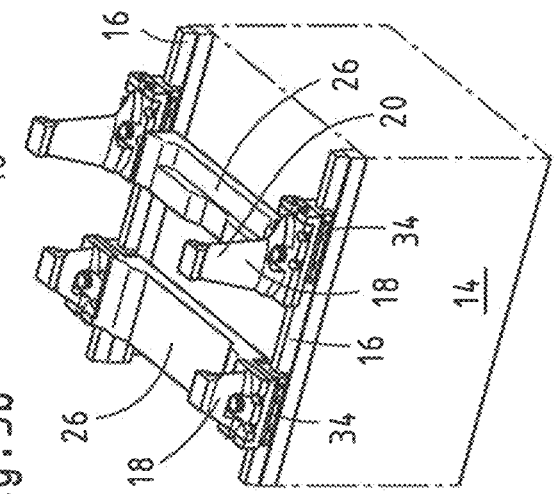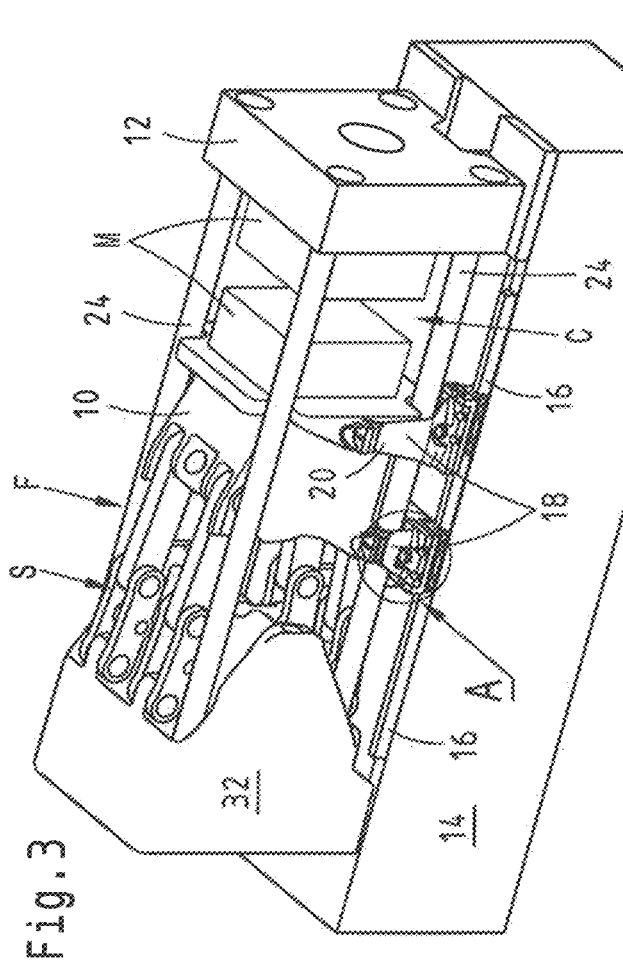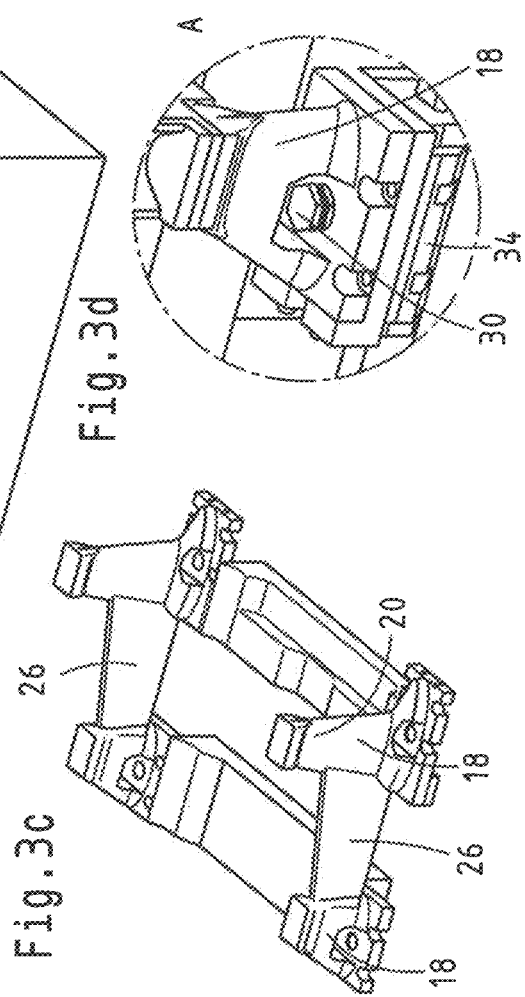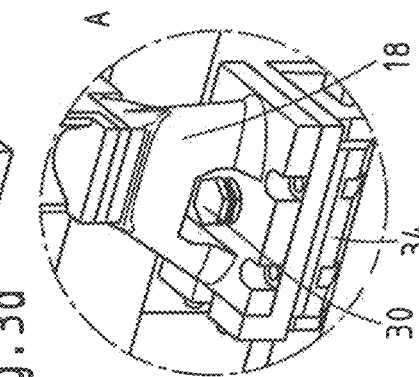

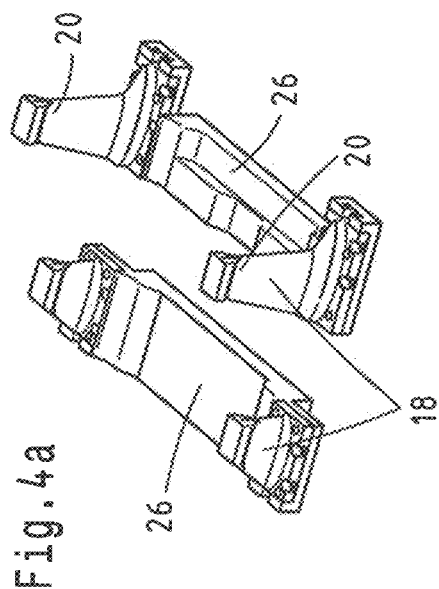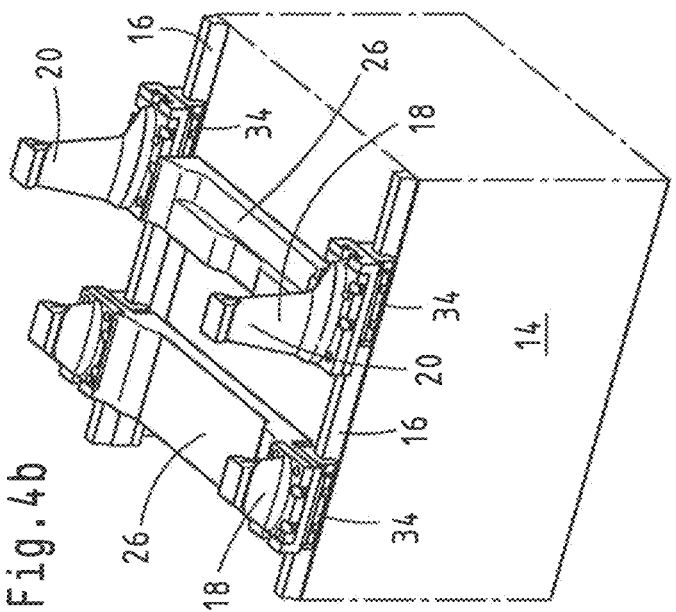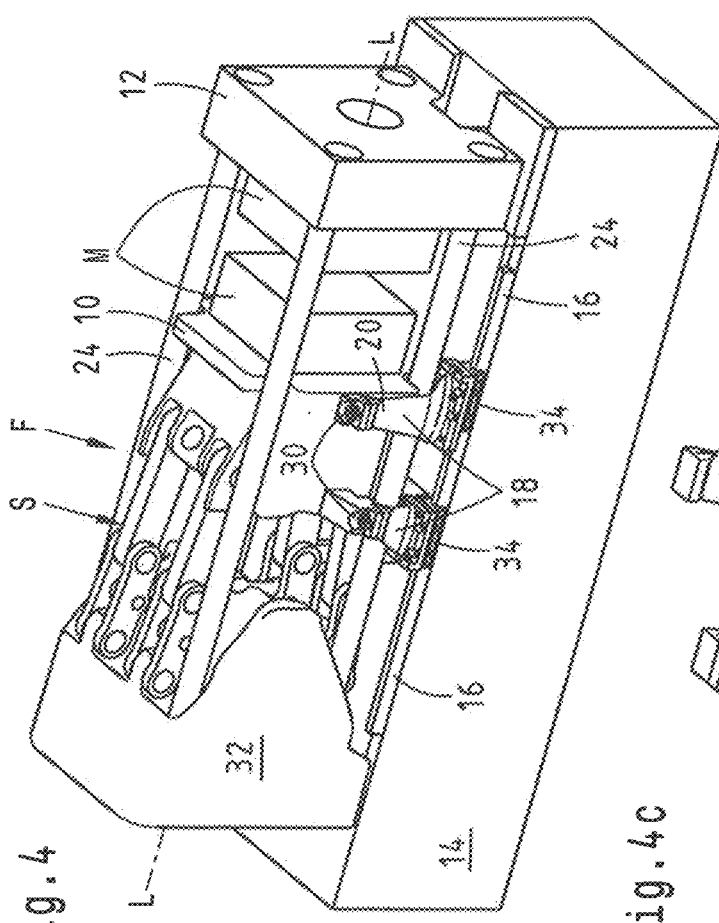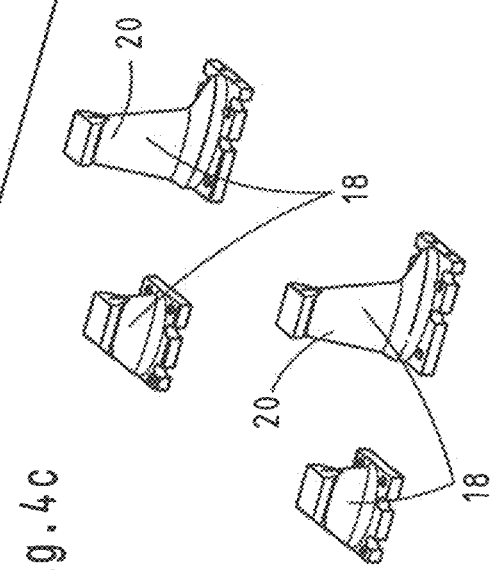

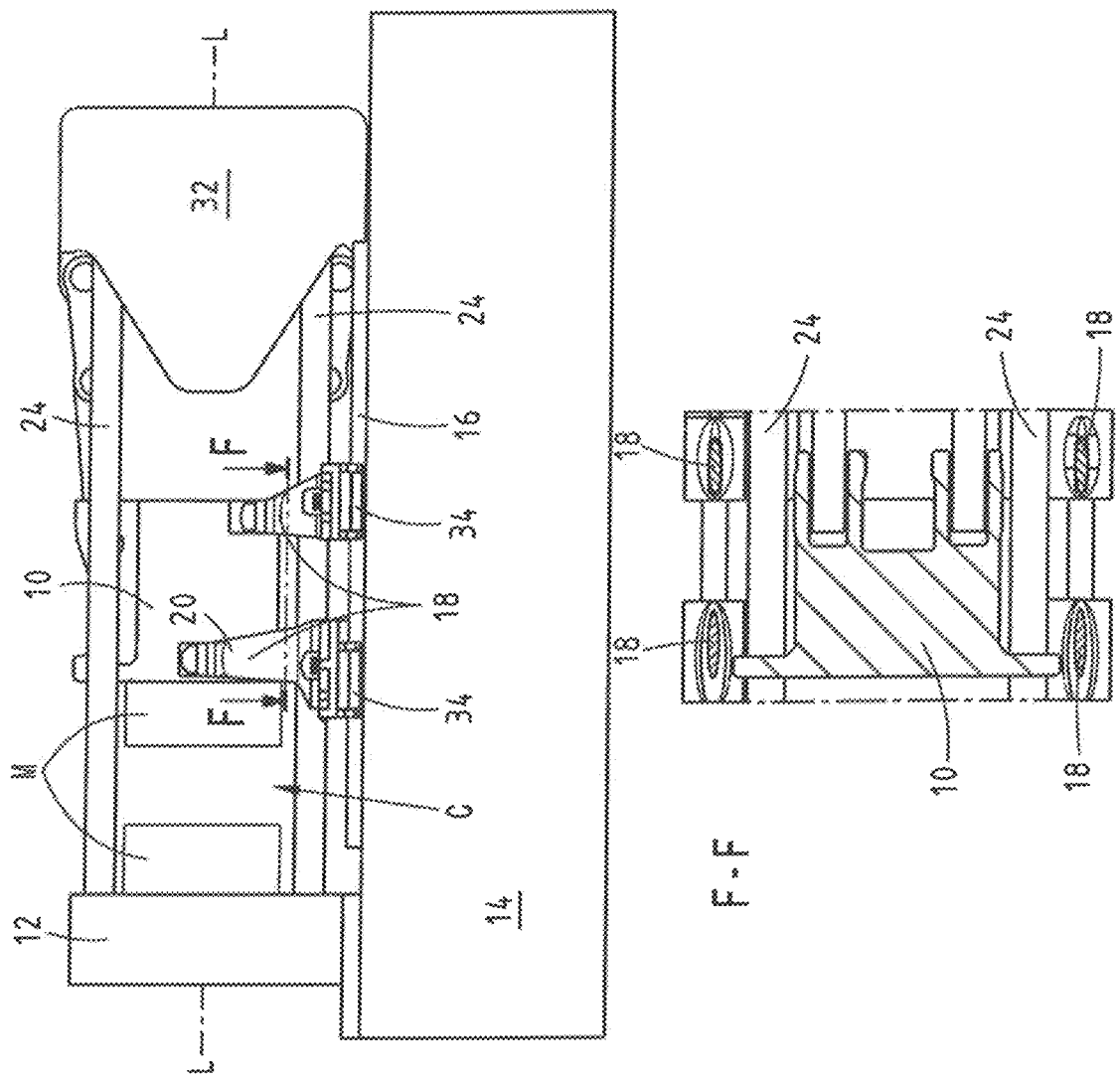

MOULD-CLOSING UNIT FOR AN INJECTION-MOULDING MACHINE FOR PROCESSING PLASTICS

CROSS REFERENCE TO RELATED APPLICATIONS

The present application relates to and claims the priority of German patent application 10 2020 117 168.4, filed on 30 Jun. 2020, the disclosure content of which of which is hereby incorporated by reference in its entirety.

TECHNICAL FIELD

The disclosure relates to a mold closing unit for an injection molding machine for processing plastics and other plasticisable materials.

BACKGROUND

Mold closing units of injection molding machines conventionally serve, as a constituent part of an injection molding machine, for opening and closing an injection mold in a longitudinal direction of the machine. For this purpose, a mold carrier that is configured to travel, also called a movable mold carrier, can be moved cyclically by a drive mechanism, such as a closing mechanism and a corresponding drive, in the longitudinal direction of the mold closing unit between an opening and closing position of the injection mold. In order to enable this movement, there is required a corresponding linear bearing or linear guide by which it is also possible to support the force of the weight of the movable mold carrier on a machine base.

U.S. Pat. No. 4,948,358 A discloses a mold closing unit for an injection molding machine having a mold carrier which is movable in a longitudinal direction of the mold closing unit and which creates a mold clamping space between itself and a further mold carrier, for the purpose of receiving an injection mold. The movable mold carrier is supported on a linear guide on a machine base by way of a load-bearing part. Above the linear guide, the load-bearing part has a coupling region for the movable mold carrier, which is connected to the movable mold carrier and of which the rigidity is greater in the longitudinal direction than in a direction transverse to the longitudinal direction (see also WO 1998/041380 A1, FIGS. 1-2; DE 11 2016 000 803 T5, FIGS. 1-3).

There is known from WO 2009/051095 A1, FIGS. 3-4, a comparable mold closing unit in which the coupling region is at a height of 20 to 70%, preferably 40 to 60%, of the height of the movable mold carrier and thus approximately at the height of the neutral axis in respect of thermal expansion (see also DE 10 2014 002 474 A1, FIG. 1).

In order to influence the flow of forces, it is already provided in JP 2014-104732 A, FIGS. 1-4, for a recess in the material to be made in the movable mold carrier.

US 2018/0207848 A1 discloses, for the movable mold carrier, a load-bearing part that is in one piece with the mold carrier.

US 2008/0175938 A1 discloses a mold closing unit having a movable mold carrier that is supported on a linear guide over a relatively long distance.

DE 10 2016 119 583 B3 discloses a device of this kind in which the movable mold carrier is supported on linear guides by way of load-bearing shoes. There, provided within the load-bearing shoes is an encapsulation by which a lubricant which is released on movement of the mold carrier is at least partly retainable.

BRIEF SUMMARY

The disclosure minimises the forces that act on guidance of the movable mold carrier during operation of the injection molding machine.

Advantageous developments form the subject-matter of the dependent claims. The features that are mentioned individually in the claims are combinable in a technologically meaningful manner, and may be supplemented by explanatory factual material from the description and details from the Figures, with further variant embodiments of the disclosure being indicated.

The mold closing unit is arranged on a machine base for setting up the mold closing unit stably. Provided is at least one mold carrier which is movable in the longitudinal direction of the mold closing unit and which, with a further mold carrier, forms a mold clamping space. Parts of at least one cyclically openable and closable injection mold may be received in the mold clamping space. Further arranged on the machine base is a linear guide for guiding the at least one movable mold carrier during movement in the longitudinal direction. A load-bearing part is provided for supporting the movable mold carrier on the linear guide or on the machine base. The load-bearing part takes a form such that it is coupled to the at least one movable mold carrier, with positive engagement or by a substance-to-substance bond, above the at least one linear guide such that a coupling region is formed. This coupling region takes a form such that its rigidity is greater in the longitudinal direction than in a direction transverse to the longitudinal direction. In the region of transition from the mold carrier to the load-bearing part, this basically forms a geometric connection which is configured and suited to "rigidly" or "stably" absorbing the forces that occur during operation of the injection molding machine in the vertical direction (for example the force of weight) and in the longitudinal direction of the machine (for example dynamic loads as a result of the movement of the mold carrier and the injection mold), and yet is flexible in the transverse direction in respect of deformations that occur for example as a result of thermal expansion of the injection mold during injection of the plasticised material and subsequent cooling until the injection molded part is released from the injection mold, or as a result of deformation under the closing force.

According to the invention, the load-bearing part and/or the coupling region take an elliptical form, since the elliptical shape best ensures the introduction of forces and, at the same time, the formation of a rigid and a less rigid axis. In this arrangement, the longer axis is provided in the longitudinal direction of the machine, while the smaller axis of the ellipse supports flexing of the coupling region transverse to the longitudinal direction, preferably horizontally. This bionic form has the result that forces that occur in the longitudinal direction of the machine are properly transmitted, in a targeted manner, through a rigid coupling, while forces in the transverse direction remain "soft" in the system without in particular unduly loading the longitudinal guides.

This specifically influences which forces can be dissipated through the load-bearing part, namely those in the longitudinal direction and the forces of weight, while the forces that occur transversely to the longitudinal direction and thus typically horizontally are not transmitted in this direction at all, or at least to a markedly lesser extent, as a result of the "soft" formation of the coupling region, with the result that these forces do not load the linear guide, or at least to a smaller extent.

At the same time, a flexible element is created, namely the coupling region that is soft transverse to the longitudinal direction, preferably in the horizontal direction, in order to absorb the transverse elongation and to dissipate it in a manner optimised to the structure. By appropriately affecting the rigidity in a manner depending on the desired direction of force introduction, this can optimally resolve the conflicts between the weight force, dynamic forces and thermal expansion forces.

Preferably, the rigidity of the coupling region is greater in the vertical direction than in the direction transverse to the longitudinal direction, with the result that advantageously the force of weight is typically transmitted in its entirety to the linear guide through the load-bearing part and arrives in the machine base by the shortest route, which at the same time reduces possible tilting moments.

In a preferred embodiment, the direction transverse to the longitudinal direction is a horizontal direction preferably lying approximately in the plane of the longitudinal direction corresponding approximately to the axis of injection of the injection molding machine. As a result, advantageously the basic prerequisites both for a central introduction of force and also for the transmission, or indeed reduced transmission, of forces are provided, since the arrangement thus comes to lie with its centre axis approximately in the region of the neutral axis of the mold.

In a preferred embodiment, the movable mold carrier is supported and mounted on the linear guide by way of a carriage on which the load-bearing part and hence the coupling region are mounted. This advantageously serves, on the one hand, to support the movable mold carrier on the linear guide in the longitudinal direction over a relatively long region. At the same time, the forces are introduced into the machine base in a manner distributed over a relatively large surface. Depending on the construction, the carriage may additionally contribute to making the entire system intrinsically more rigid. Because, typically, a plurality of linear guides—that is to say usually two linear guides—are arranged on either side of the machine base, an appropriately dimensioned carriage results in a three-dimensional framework for introducing the forces into the machine base.

Preferably, the carriage is formed in a plurality of parts and/or has a plurality of load-bearing parts, such that advantageously the parts of the carriage can be adjusted or made more rigid relative to one another as required in order for example to increase rigidity in the longitudinal direction and/or to reduce flexing transverse to the longitudinal direction. Likewise, a height adjustment part may also be provided between the parts of the carriage.

For the purpose of better load transmission, it is likewise an advantage if the movable mold carrier is advantageously supported on the linear guide on a plurality of support elements that are at a spacing from one another in the longitudinal direction of the mold closing unit.

In principle, the coupling region may be formed in various ways. Preferably, it is formed by a material link—that is to say the load-bearing part and the movable mold carrier are connected to one another by a substance-to-substance bond or are made from a single material, in that they are made for example in one piece, or in the exemplary embodiment are cast in one piece. However, because the material link allows different levels of rigidity in the coupling region in the longitudinal direction and transverse to the longitudinal direction of the mold closing unit, it is advantageously possible, as a result of appropriate dimensioning, to ensure the desired introduction of dynamic loads and of weight forces at the same time as flexing in the transverse direction.

Preferably, provided on the load-bearing part and/or the coupling region is at least one load-measuring element, which preferably takes the form of a measuring element for force or elongation and is preferably arranged in the longitudinal direction and the transverse direction. As a result, the forces in this region can advantageously be sensed very well, such that it is possible to detect whether there is any overload on the deformation elements, such as the load-bearing part, and/or the guide elements.

More preferably, this load-measuring element is arranged in the region of the material link and the load-bearing part connected to it, since as a result of the one-piece formation the forces there can advantageously be sensed unambiguously and optimally at these compensating solid-state couplings, in particular by means of strain gauges.

In an alternative preferred embodiment, a recess in the material is provided in the movable mold carrier for the purpose of reducing the rigidity of the coupling region transverse to the longitudinal direction, that is to say in the transverse direction. For this purpose, the movable mold carrier is supported on the mutually spaced support elements on the linear guides that are arranged on either side of the machine base, such that the recess in the material is provided in the movable mold carrier between these linear guides. As a result of the recess in the material, advantageously the rigidity is reduced in a targeted manner at points where no force, or as little force as possible, is to be transmitted.

In principle, the coupling region may also be formed in a different way, in that either a positive engagement is created or a mechanical connection between the load-bearing part and the movable mold carrier is made, this being formed such that, advantageously, different levels of rigidity are ensured from a structural point of view.

Preferably, the coupling region is at a height of 20 to 70%, preferably 40 to 60%, of the height of the movable mold carrier. If the coupling is made approximately in the centre of the movable mold carrier then, in the event of thermal loads as a result of cyclic heating and cooling of the injection mold, this corresponds approximately to the neutral axis, at which the least deformation occurs in the vertical direction in the event of heat being introduced centrally. Consequently, this region is advantageously best suited for a connection between the mold carrier and the load-bearing part. A coupling in this region, which also corresponds approximately to the height of the centre of gravity of the injection mold, can at the same time contribute to reducing the risk of tilting during movement of the movable mold carrier.

In a preferred exemplary embodiment, in addition the further mold carrier, which may typically be a mold carrier that is stationary in relation to the machine base, may also likewise comprise a coupling region of this kind, in order advantageously to reliably introduce the forces of weight substantially into the machine base there too, but at the same time to retain forces resulting from movement or temperature expansion flexibly within the system.

It has been found advantageous if a height adjustment part is additionally provided for adjusting the height of the movable mold carrier in relation to the linear guide. This height adjustment part may act at different locations and serves primarily to set the movable mold carrier at its optimum height such that it is guided reliably on the linear guides and at the same time the manufacturing tolerances of the components concerned can be compensated. In particular, with this arrangement it is possible to ensure that there is no contact with the tie bars or columns, which connect the support of the closing mechanism to the stationary mold carrier and through which the closing forces are transmitted, with the result that the tie bars or columns are now used solely as tension anchors.

A height adjustment part of this kind may act at different points on the mold closing unit. Preferred points have been found to be the coupling region itself but also an arrangement between the load-bearing part and the carriage and/or between the carriage and the linear guide.

In a further preferred exemplary embodiment, the carriage itself may also be in multiple parts, in which case the height adjustment part is provided between the parts of the carriage.

In order advantageously to enable simple operation of the height adjustment part, in a preferred exemplary embodiment it is possible for the height adjustment part to have a pre-settable height setting range with a manually actuable setting lever. Operation is then comparable with a headlight range adjustment on a vehicle. By an adjustment of the setting lever, the height is rapidly and reliably altered upward or downward by way of a manual intervention. At the same time, it is thus possible to actively affect load conditions that change and/or vary even during operation.

Further advantages are apparent from the description below of preferred exemplary embodiments.

BRIEF DESCRIPTION OF THE FIGURES

The disclosure is explained in more detail below with reference to a plurality of exemplary embodiments that are illustrated in the attached Figures, in which:

FIG. 3 shows a mold closing unit in a three-dimensional view, according to a further exemplary embodiment, FIGS. 3a, 3b, 3c show enlarged views of exemplary embodiments of the movable mold carrier according to FIG. 3, FIG. 3d shows an enlarged view of the height adjustment part on the carriage, at the bottom, FIG. 4 shows a mold closing unit in a three-dimensional view, according to a further exemplary embodiment, FIGS. 4a, 4b show an enlarged view of the movable mold carrier according to FIG. 4, FIG. 4c shows an enlarged view of the movable mold carrier according to FIG. 4, FIG. 5 shows a side view of the mold closing unit according to FIGS. 1-4, FIG. 5a shows a section through the mold carrier, along the line F-F in FIG. 5.

DETAILED DESCRIPTION

Figure 1A:
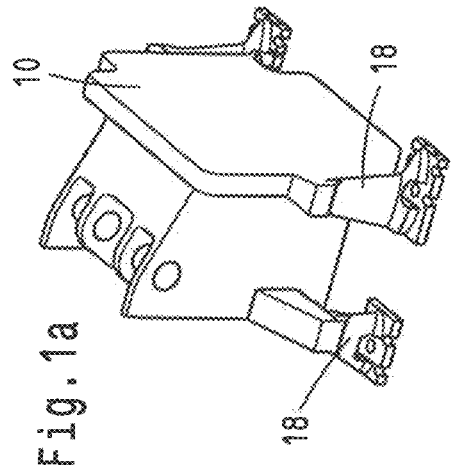
FIGS. 1a, 1b show an enlarged detail from FIG. 1 in the region of the movable mold carrier.

The disclosure is now explained in more detail by way of example, with reference to the attached drawings. However, the exemplary embodiments are only examples, which are not intended to restrict the inventive concept to a particular arrangement. Before the invention is described in detail it should be pointed out that it is not restricted to the respective structural parts of the device and the respective method steps, since these structural parts and method may vary. The terms used here are merely intended to describe particular embodiments and are not used restrictively. Moreover, where the singular or the indefinite article is used in the description or the claims, this also refers to a plurality of these elements unless the overall context unambiguously indicates otherwise.

The Figures show, in several embodiments, a mold closing unit F for an injection molding machine for processing plastics and other plasticisable materials, such as powder or ceramic materials. In the Figures, only the mold closing unit of the injection molding machine is illustrated, and this is arranged on a machine base 14 and conventionally cooperates with an injection molding unit (not illustrated in the drawing). In the injection molding unit, plastics or plasticisable materials are prepared, homogenised and plasticised so that they can then be injected into a mold cavity of an injection mold M that is received in the mold clamping space C of the mold closing unit F. A construction of this kind for injection molding machines is well known, so there is no need to give more details on this point.

Figure 1B:
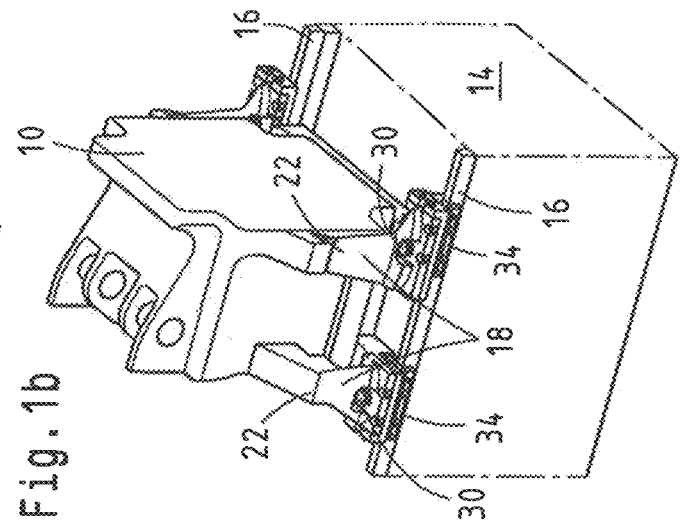
Figure 1:
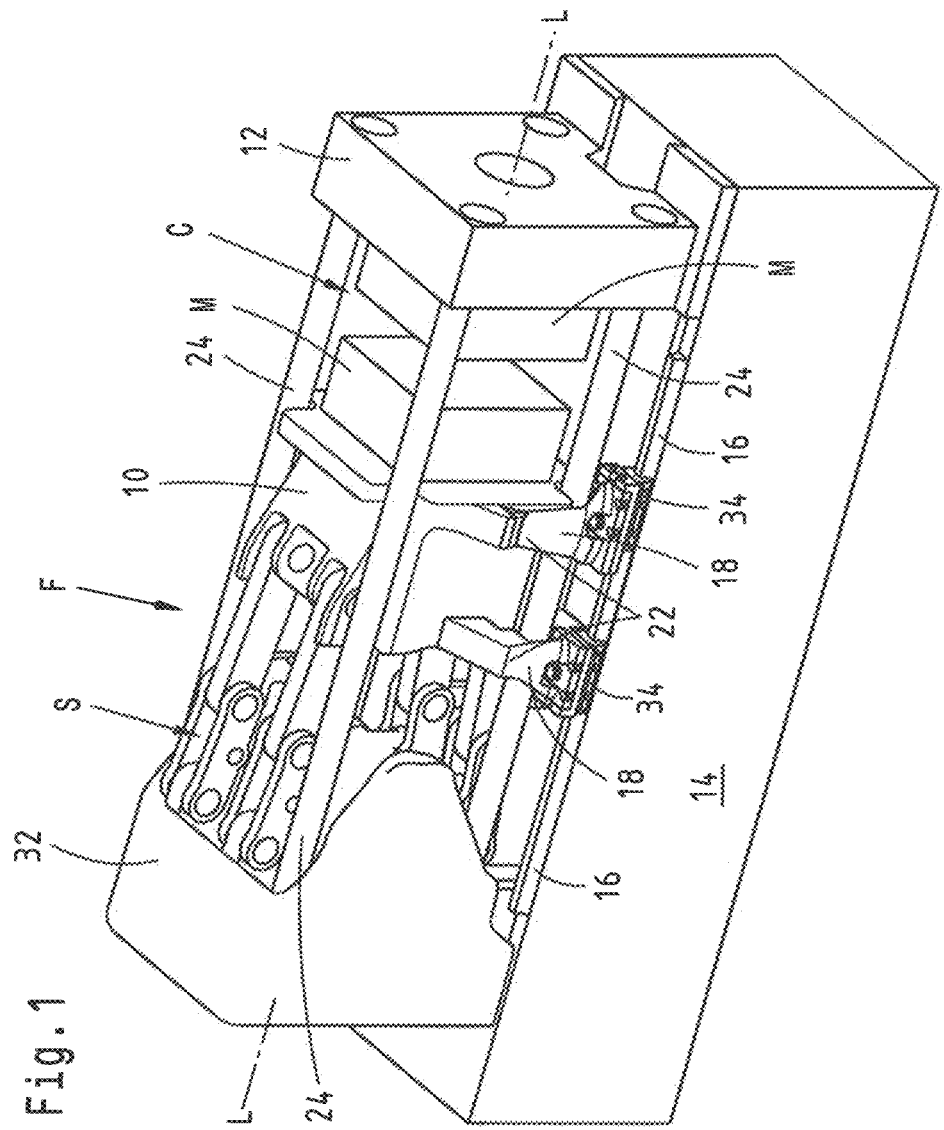
FIG. 1 shows a three-dimensional view of a mold closing unit.

According to FIG. 1, the mold closing unit F is set up stably on the machine base. Typically, the mold closing unit F comprises at least one mold carrier 10 that is configured to move in the longitudinal direction L-L of the mold closing unit, and a further mold carrier 12 that is preferably a stationary mold carrier fixedly connected to the machine base. Depending on the size of the machine, it is also possible, as in the present case, for the movable mold carrier 10 also to take the form of a frame carrier and to have a carrying structure behind the actual mold clamping plate.

In principle, the injection molding machine may equally be a two-plate machine or a three-plate machine, in which case, as in FIG. 1, an additional support 32 is provided at the left-hand end of the mold closing unit for a closing mechanism S that is actuable by a closing drive. The motorised drive of the closing mechanism is hidden beneath the cover of the support element 32. However, it can be seen in the present exemplary embodiment that the closing mechanism is a toggle mechanism. In principle, however, it is also possible for other closing mechanisms, such as hydraulic, pneumatic, electromechanical or indeed electrical closing mechanisms and associated drives to be used.

When injection molded parts are manufactured, at the beginning of the injection cycle the movable mold carrier 10 is transferred from an open position of the injection mold M to a closed position of the injection mold M by the closing mechanism S. Once mold closure of the injection mold has been achieved in this way, material that has been plasticised by the injection molding unit (not illustrated in the drawing) is injected into the mold cavity of the injection mold M. At this stage, the injection mold is typically heated up in order to support the flowability of material when the plasticised material is injected. After injection, the plasticised material is cooled under backpressure until it has solidified enough to be capable, when the injection mold M is opened, of being ejected or released from the mold cavity as an injection molded part.

The opening and closing movement is performed by means of the closing mechanism S, and during this the movable mold carrier 10 is guided along at least one linear guide 16, which is arranged on the machine base 14 in the longitudinal direction L-L of the mold closing unit F. In the exemplary embodiment, two linear guides 16, one on each side of the machine base 14, are provided for the purpose of guiding the at least one movable mold carrier 10. In principle, however, more than two or indeed only one linear guide 16 may be provided.

During an injection cycle, the parts of the injection mold M are opened and closed cyclically in order to manufacture injection molded parts cyclically. The forces that occur on opening and closing the injection mold M, and the closing force, are transmitted through the tie bars 24 between the further mold carrier 12 and the support 32—in the case of a two-plate machine between the movable mold carrier 10 and the mold carrier 12. However, there is no need to use tie bars 24 or columns as the force-transmission elements; force-transmission elements with no tie bars may also be provided, in known manner, which enable free access to the mold clamping space C. The mold closing unit F according to the invention may also be constructed with no tie bars.

In order to absorb the forces that occur during this manufacturing procedure and transmit them to the machine base 14, there is provided a load-bearing part 18, which supports the at least one movable mold carrier 10 on the machine base 14 and/or on the at least one linear guide 16. In the exemplary embodiment, the load-bearing part 18 transmits the forces through a carriage 26 and to at least one support element 34—in the exemplary embodiment, a plurality of support elements 34—which for their part slide on the linear guide 16 and thus transmit the forces through the linear guide and into the machine base 14.

These forces are various forces that occur during the injection molding procedure. On the one hand there are the weight forces of the movable mold carrier 10 plus the weight force of the injection mold M. In the case of a relatively large machine, this can easily be a weight force of 10 to 100 kN. Moreover, dynamic forces also arise during the injection molding procedure as a result of the movement of the movable mold carrier 10 in the longitudinal direction L-L, from the open to the closed position of the injection mold M and vice versa. These dynamic forces must be introduced reliably into the machine base, if only to counter the possibility of a tilting of the mold carrier together with the mold.

However, further forces also arise because the injection mold M has to be heated to a particular temperature before injection and cooled again for the purpose of cooling the injected materials. As a result of thermal expansion of the materials, it is possible for forces to arise here that may have a disadvantageous effect, primarily in a direction transverse to the longitudinal direction L-L of the mold closing unit F. In this transverse direction, these forces affect in particular the linear guides, which are consequently exposed to an additional load and hence to wear.

In order to introduce these forces into the machine base as far as possible without unduly loading the linear guide, since that is disadvantageous to the precision of the mold closing unit and hence to the quality of the injection molded parts to be manufactured and moreover has an adverse effect on the service life of the components, these forces are to be considered separately. The weight forces should be transmitted to the machine base as directly as possible, and this is likewise the case for the dynamic forces. The forces resulting from thermal expansion, by contrast, may give rise to movements through a flexible element in the mold closing unit in the transverse direction, that is to say in a direction transverse to the longitudinal direction L-L of the injection molding machine. The conflict that prima facie arises, of certain forces being guided away while other forces remain in the system, is resolved in that the load-bearing part 18 has a coupling region 20 for the at least one movable mold carrier 10, above the at least one linear guide 16. This coupling region 20 is connected with positive engagement or by a substance-to-substance bond to the movable mold carrier 10, and its rigidity is greater in the longitudinal direction L-L than in a direction transverse to the longitudinal direction L-L.

FIG. 5 shows schematically a side view of a mold closing unit F such as can basically be seen in each of the exemplary embodiments. FIG. 5*a* shows a section through the movable mold carrier 10, along the line F-F in FIG. 5. Here, the cross section of the load-bearing part 18 and the coupling region can be seen. The load-bearing part 18 and/or the coupling region 20 are elliptical in cross section, wherein the smaller axis of the ellipse extends in a direction transverse to the longitudinal direction L-L of the mold closing unit F, preferably in the horizontal direction. Thus, the load-bearing part 18 and the coupling region 20 are more flexible in this direction than in the direction of the long axis of the ellipse. This is effectively to say that the rigidity of the coupling region 20 and that of the load-bearing part 18 are less in the transverse direction than in the longitudinal direction L-L. This bionic form has the effect that the deformations occurring in the transverse direction are taken up resiliently, while at the same time there is sufficient rigidity in the other spatial directions, that is to say in the longitudinal direction L-L and vertically.

Typically, the mold closing unit F is positioned as illustrated in FIG. 1, that is to say it extends with its longitudinal direction L-L horizontal. Thus, the weight forces act vertically, and to counteract these or to counteract the deflection caused by them the injection molding machine must be of correspondingly rigid construction. A rigidity and stability in respect of the dynamic loads is likewise also required, since these must be introduced into the machine base rapidly and reliably. In the transverse direction, that is to say in a direction transverse to the longitudinal direction L-L, by contrast, according to the invention the mold closing unit is flexible in respect of forces resulting from deformation under closing force, and primarily in respect of thermal growth and thus forces of thermal expansion.

For this reason, the coupling region is constructed to be more rigid in both the longitudinal direction and the vertical direction than in the direction transverse to the longitudinal direction L-L.

In the first exemplary embodiment in FIG. 1, the load-bearing part 18 and thus also the associated coupling region are cast fixedly on the movable mold carrier 10, that is to say there is a substance-to-substance bond. The coupling is made by way of a material link 22, but one that takes a structural form such that its rigidity in the longitudinal direction L-L is greater than in a direction transverse to the longitudinal direction L-L. The material link 22 can be seen in particular in FIGS. 1*a* and 1*b*, in which the mold carrier 10 is illustrated by itself and on the machine base 14 respectively.

In this exemplary embodiment as also in the following exemplary embodiments, in all cases there is provided a height adjustment part 30, which in the one-part construction, and hence that having a substance-to-substance bond, of the connection between the load-bearing part 18 and the mold carrier 22 may be arranged only at the bottom between the load-bearing part 18 and the support elements 34.

A height adjustment part of this kind is required in order to compensate for the manufacturing tolerances of the components concerned. Used as the height adjustment part is a bolt/threaded pin solution, as is generally known in the prior art.

Figure 2:
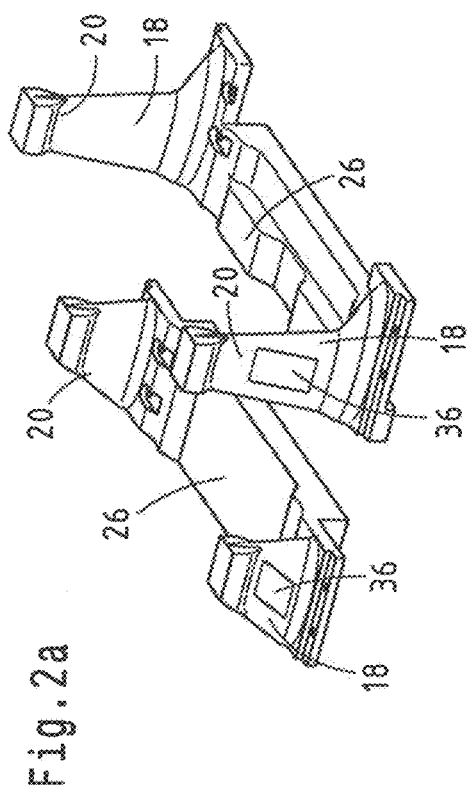
FIG. 2 shows a mold closing unit in a three-dimensional view, according to a further exemplary embodiment.

FIG. 2 shows a mold closing unit according to a further exemplary embodiment, in which a carriage 26 is provided on which the movable mold carrier 10 is mounted. The movable mold carrier is supported on the linear guide 16 by way of the carriage. According to FIG. 2a, the load-bearing parts 18 are a constituent part of the lower carriage 26, it being possible for the carriage to have a plurality of parts according to FIG. 2a. However, even in the case of an embodiment according to FIG. 2c these parts may be connected to one another to form a carriage. A one-part construction gives greater rigidity, whereas in a multiple-part construction there is less influence by heat on the linear guide 16.

In the exemplary embodiment of FIG. 2, the height adjustment part 30 is indicated as a bolt/threaded pin solution at the top. This is also clear from the enlarged illustrations according to FIGS. 2d and 2e. In FIG. 2e, it is possible to provide a setting range here by adjusting the bolt. According to FIG. 2d, by contrast, the height adjustment part 30' there may have a setting limit, since in that case there is provided a pre-settable height setting range with a manually actuable setting lever 42 that is, however, only movable within a limited range. A construction of this kind makes it easier for the user to carry out a height adjustment rapidly and easily by moving the setting lever 42 to left or right. This is comparable with a headlight range adjustment in a vehicle, in which the height of the light beam is likewise set by a rotary movement.

By the use of a plurality of load-bearing parts 18, as in particular in an embodiment using a carriage 26, the forces can be guided away to the machine base 14 in a manner distributed over a relatively long surface along the linear guide 16. For this purpose, the support elements 34 are at a spacing from one another in the longitudinal direction L-L of the mold closing unit F.

Figure 2A:
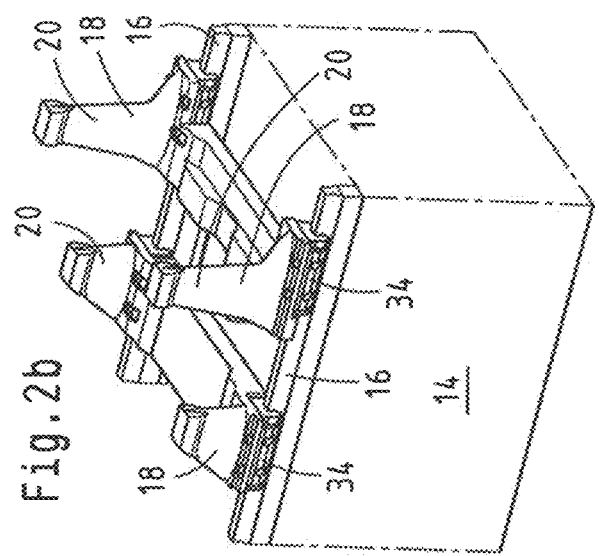
FIGS. 2a, 2b, 2c show enlarged views of exemplary embodiments of the movable mold carrier according to FIG. 2, FIGS. 2d, 2e show enlarged views according to FIG. 2 of a height adjustment part, with setting range.
Figure 2C:
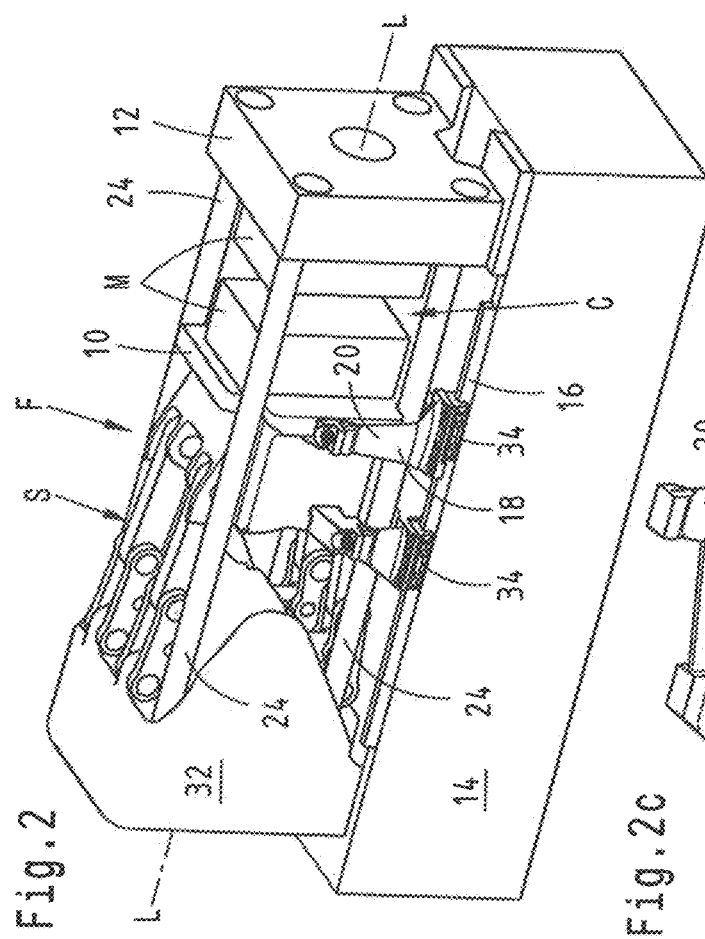
Figure 2B:
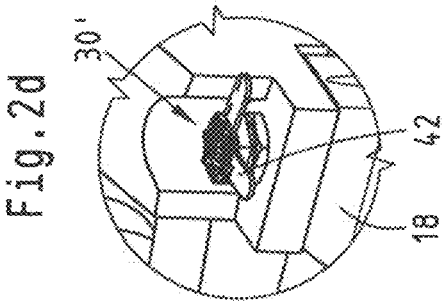
Figure 2E:
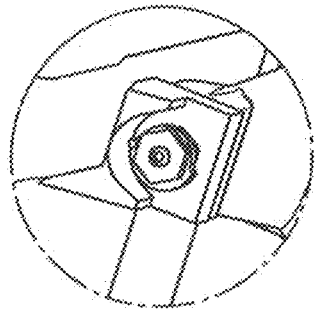
Figure 2D:
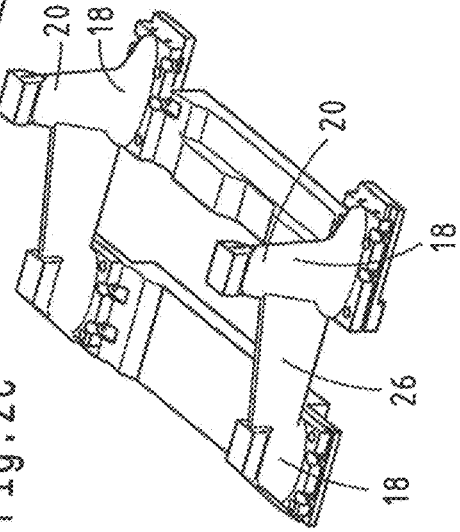

By way of example, FIG. 2a also shows an arrangement of at least one load-measuring element 36, in the exemplary embodiment two load-measuring elements 36. Here, the load-measuring elements 36 are mounted on the load-bearing part 18, but they may also, in addition or as an alternative, be mounted on the coupling region 20. The load-measuring element 36 preferably takes the form of a measuring element for force or elongation and is preferably arranged in the longitudinal direction and the transverse direction. As a result, the forces in this region can be sensed very well, such that it is possible to detect whether there is any overload on the deformation elements, such as the load-bearing part 18, and/or the linear guide 16.

More preferably, however, this load-measuring element 36 is arranged in the region of a material link 20 and the load-bearing part 18 connected to it, as shown in FIG. 1. As a result of the one-piece formation the forces there can be sensed optimally at these compensating solid-state couplings, in particular by means of strain gauges.

The exemplary embodiment of FIG. 3 shows a further embodiment of the mold closing unit F in which the load-bearing part 18 is a separate part that is secured to the carriage 26. Here, the carriage 26 may, as in the second exemplary embodiment of FIG. 2, comprise a plurality of parts according to FIG. 3a or two mutually connected parts according to FIG. 3c, and in this case the height adjustment part 30 is arranged between the carriage 26 and the linear guide 16 according to FIG. 3d, that is to say it is at the bottom by comparison with the other exemplary embodiments. Further, the load-bearing part 18 is screwed to the movable mold carrier 10 at the top, without the possibility of adjustment. Here too, the coupling region 20 is constructed to be more rigid in the longitudinal direction L-L than in a direction transverse to the longitudinal direction.

FIG. 4 shows a further exemplary embodiment in which the load-bearing part 18 is an independent structural part, which according to FIGS. 4a and 4b is screwed on to both the carriage 26 and the movable mold carrier 10. According to FIG. 4, a height adjustment part 30 is provided on the load-bearing part 18, above the coupling region 20, but this could equally be arranged at the bottom or between the carriage 26 and the linear guide 16. The more parts are provided for the load-bearing part 18 and the carriage 26, the less influence there is by heat on the linear guide 16, and the fewer parts provided, the more rigid the carriage and hence the transmission of force.

Figure 6:
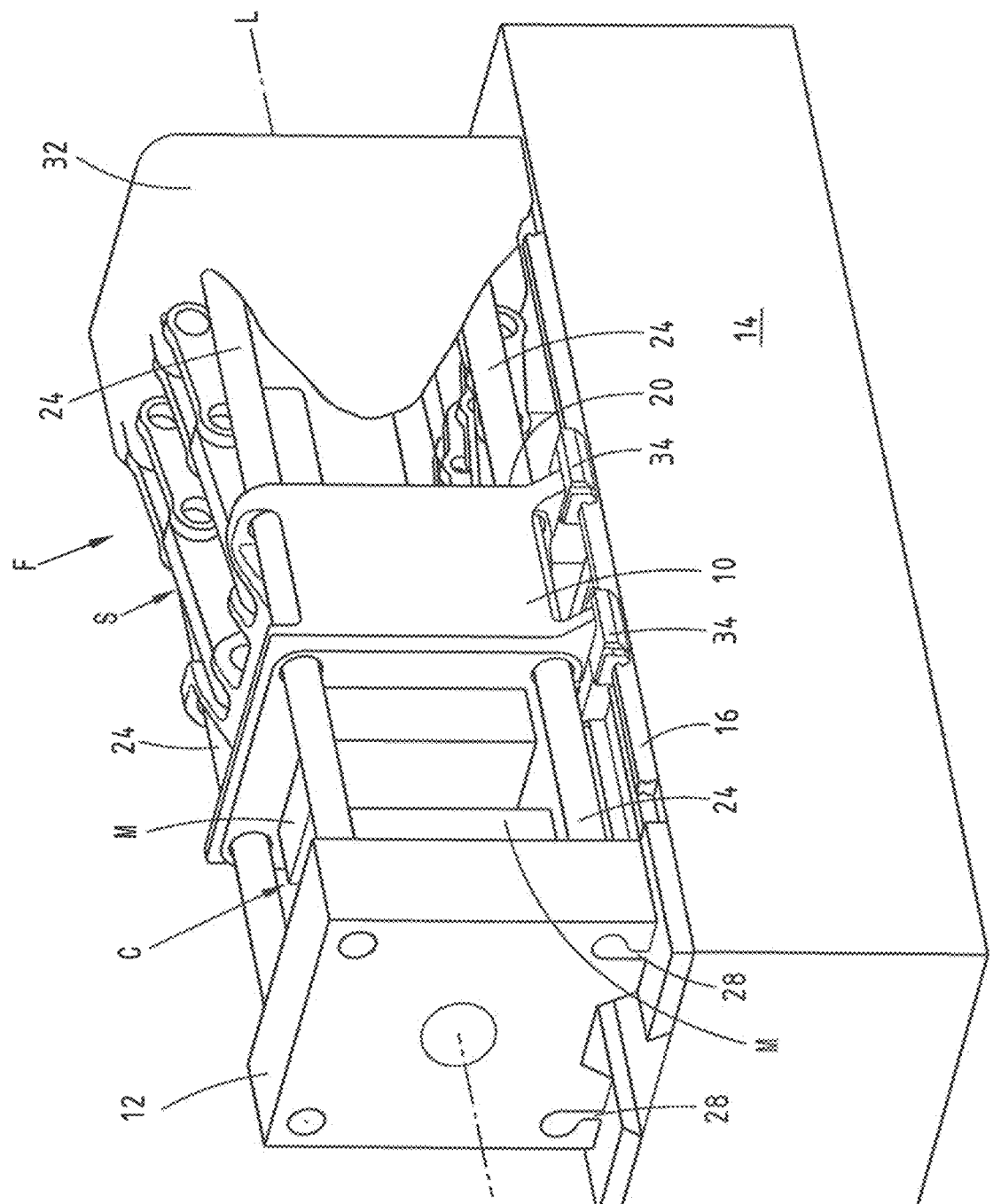
FIG. 6 shows a mold closing unit in a three-dimensional view, according to a further exemplary embodiment.
Figure 7:
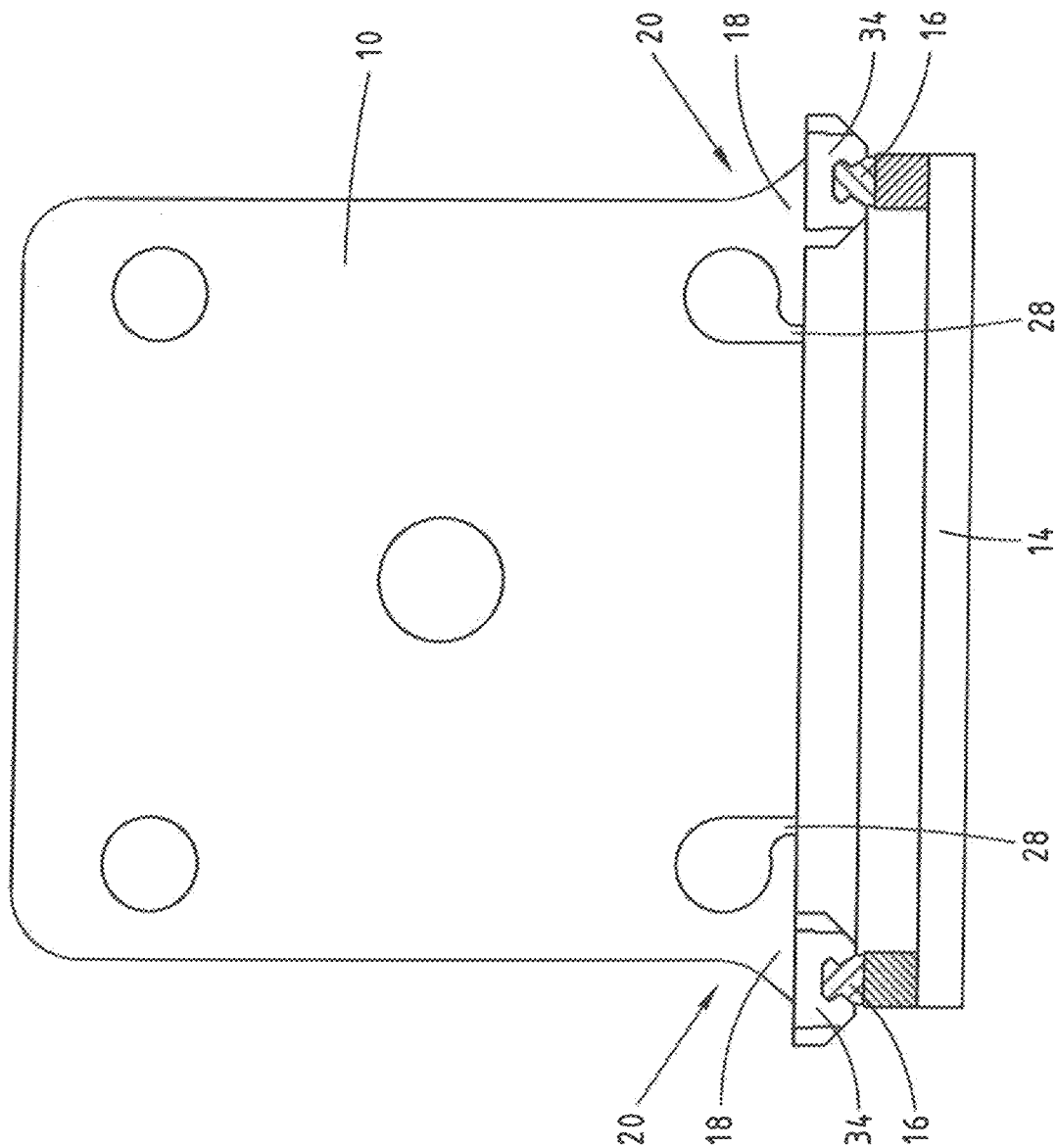
FIG. 7 shows a view of the movable mold carrier according to FIG. 6, supported on the machine base.

In addition or as an alternative, also within the scope of the fifth exemplary embodiment in FIGS. 6, 7, the rigidity in the longitudinal direction L-L may be achieved in that at least one recess 28 in the material is provided in the movable mold carrier 10 according to FIG. 7, transverse to the longitudinal direction L-L and preferably in the horizontal direction, for the purpose of reducing the rigidity of the coupling region 20. It can clearly be seen that this makes the load-bearing part 18 and/or the coupling region 20 "softer" in the lower region, with the result that transverse deformations occurring in the movable mold carrier 10 are transmitted into the region of the linear guide 16 to a markedly lesser extent.

Whereas, in the first exemplary embodiment of FIG. 1, a connection by substance-to-substance bond is provided between the load-bearing part 18 and the movable mold carrier 10, in the further exemplary embodiments of FIGS. 2 to 4 this connection is a positive engagement, in that the parts are mechanically connected to one another.

The exemplary embodiments have in common the fact that the coupling region 20 is at a height of 20 to 70%, preferably 40 to 60%, of the height of the movable mold carrier 10 and hence approximately at the height of the neutral axis in respect of thermal expansion. Thus, the movable mold carrier 10 is coupled approximately in the centre, which from a structural point of view is a good position for the introduction of forces. The central coupling point is a neutral axis in respect of thermal expansion in the event of a centrally located heating by the injection mold M, for thermal expansion both at the bottom and at the top. Thus, in this plane there results substantially only transverse expansion, which can be taken up through the flexible load-bearing part 18 with the coupling region 20. At the same time, an approximately central coupling also has the advantage of coupling approximately at the height of the centre of gravity of the movable mold carrier 10 and the injection mold M, with the result that tilting moments are also countered by this.

In principle, the further mold carrier 12 (e.g. according to FIG. 6) may also take a form analogous to the movable mold carrier 10, that is to say that from a structural point of view a corresponding flexibility may also be provided in the transverse direction. This is particularly true if it does not take the form of a stationary mold carrier, but even as the stationary mold carrier a coupling of this kind, provided through a coupling region 20 with different levels of rigidity depending on the orientation of the coupling region, may be advantageous in order to guide away the forces occurring during the injection molding procedure reliably and in a targeted manner.

As an alternative, for the height adjustment parts shown it is also possible to use wedges of which the oblique faces slide on or off one another, in order in this way to adjust the height of the movable mold carrier in relation to the linear guide.

According to the invention, in all cases a mold closing unit is created with which the linear guide may be provided for the purpose for which it is configured, namely guiding the movable mold carrier 10, wherein it can guide away into the machine base 14 weight forces and dynamic loads. Moreover, it is largely freed from the forces occurring during operation. It goes without saying that this description may be subject to the most diverse modifications, changes and adaptations which are within the range of equivalents to the attached claims.

The invention claimed is:

1. A mold closing unit for an injection molding machine for processing plastics and other plasticisable materials, comprising
    a machine base configured for setting up the mold closing unit,
    a mold carrier which is movable in a longitudinal direction of the mold closing unit and which, between itself and a further mold carrier, forms a mold clamping space configured to receive parts of a cyclically openable and closable injection mold,
    a linear guide arranged on the machine base in the longitudinal direction and configured for guiding the movable mold carrier during movement in the longitudinal direction,
    a load-bearing part supporting the movable mold carrier on at least one of the machine base and the linear guide, the load-bearing part comprising, above the linear guide, a coupling region for the movable mold carrier that is connected to the movable mold carrier in a form fitting manner or by a substance-to-substance bond,
    wherein a rigidity of the coupling region is greater in the longitudinal direction than in a direction transverse to the longitudinal direction,
    wherein at least one of the load-bearing part and the coupling region has a bionic form including an ellipse in cross section, wherein a smaller axis of the ellipse extends in a direction transverse to the longitudinal direction of the mold closing unit,
    wherein the bionic form is configured to allow deformations in the direction transverse to the longitudinal direction and to be less resilient in the longitudinal direction.

2. Mold closing unit according to claim 1, wherein the rigidity of the coupling region is greater in a vertical direction than in the direction transverse to the longitudinal direction.

3. Mold closing unit according to claim 1, wherein the direction transverse to the longitudinal direction is a horizontal direction.

4. Mold closing unit according to claim 1, wherein the movable mold carrier is supported and mounted on the linear guide by a carriage configured to be the load-bearing part or on which the load-bearing part is mounted.

5. Mold closing unit according to claim 4, wherein the carriage is in multiple parts.

6. Mold closing unit according to claim 1, wherein the movable mold carrier is supported on the linear guide on a plurality of support elements arranged at a spacing from one another in the longitudinal direction of the mold closing unit.

7. Mold closing unit according to claim 1, wherein the coupling region is formed by a material link.

8. Mold closing unit according claim 1, wherein a load-measuring element is provided on at least one of the load-bearing part and the coupling region.

9. Mold closing unit according to claim 7, wherein the load-measuring element is provided at the material link.

10. Mold closing unit according to claim 1, wherein a recess is provided in the movable mold carrier transverse to the longitudinal direction and configured for reducing the rigidity of the coupling region.

11. Mold closing unit according to claim 1, wherein the further mold carrier is a mold carrier that is stationary in relation to the machine base comprises a coupling region.

12. Mold closing unit according to claim 1, wherein a height adjustment is provided for adjusting the height of the movable mold carrier in relation to the linear guide.

13. Mold closing unit according to claim 12, wherein the height adjustment has a pre-settable height setting range with a manually actuable setting lever.

14. Mold closing unit according to claim 3, wherein the horizontal direction lies in a plane of the longitudinal direction (L-L).

15. Mold closing unit according to claim 4, wherein the carriage has a plurality of load-bearing parts.

16. Mold closing unit according to claim 1, wherein the further mold carrier comprises a coupling region configured as the coupling region of the movable mold carrier.

* * * * *